US006194113B1

(12) United States Patent
Okutani

(10) Patent No.: US 6,194,113 B1
(45) Date of Patent: Feb. 27, 2001

(54) OLEFINIC RESIN AND ELECTROPHOTOGRAPHIC TONER PREPARED THEREFROM

(75) Inventor: Haruo Okutani, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/147,730
(22) PCT Filed: Jun. 29, 1998
(86) PCT No.: PCT/JP98/02901
§ 371 Date: Feb. 25, 1999
§ 102(e) Date: Feb. 25, 1999
(87) PCT Pub. No.: WO99/00429
PCT Pub. Date: Jan. 7, 1999

(30) Foreign Application Priority Data

Jun. 27, 1997 (JP) .................................................... 9-187473
Jul. 25, 1997 (JP) .................................................... 9-215932
Dec. 5, 1997 (JP) .................................................... 9-352303

(51) Int. Cl.$^7$ .................................................. G03G 9/087
(52) U.S. Cl. ........................................... 430/109; 430/110
(58) Field of Search .................................... 430/109, 110; 525/327.6, 327.7, 117, 122, 183, 184

(56) References Cited

U.S. PATENT DOCUMENTS

| 2,988,539 | * | 6/1961 | Cohen et al. | 525/327.6 |
| 4,130,213 | * | 12/1978 | Wszolek | 525/327.6 |
| 4,612,349 | * | 9/1986 | Nicco et al. | 525/117 |
| 4,990,566 | * | 2/1991 | Hert | 525/179 |
| 5,395,895 | * | 3/1995 | Tagoshi et al. | 525/327.7 |
| 5,633,341 | * | 5/1997 | Abend | 528/335 |

FOREIGN PATENT DOCUMENTS

| 58-54348 | * | 3/1983 | (JP) . |
| 58-106553 | | 6/1983 | (JP) . |
| 60-112815 | | 6/1985 | (JP) . |
| 1-311145 | | 12/1989 | (JP) . |
| 5-9211 | * | 1/1993 | (JP) . |
| 7-504458 | | 5/1995 | (JP) . |
| 9-120177 | | 5/1997 | (JP) . |
| WO 93-09179 | | 5/1993 | (WO) . |

OTHER PUBLICATIONS

Patent & Trademark Office English Translation of Japanese Patent 5–9211 (Pub Jan. 1993).*
Patent & Trademark Office English Translation of Japanese Patent 58–106553 (Pub Jun. 1983).*
Patent & Trademark Office English Translation of Japanese Patent 58–54348 (Pub Mar. 1983).*
Grant, R et al, ed. Grant & Hackh's Chemical Dictionary, fifth Edition, McGraw–Hill Book Company, NY (1987), p. 462.*
Abstract Attached To Japanese Patent 5–9211 (Pub Jan. 1993).*
Abstract Attached to Japanese Patent 58–54348 (Pub. Mar. 1983).*
Caplus Abstract AN 1994:31533 of Japanese Patent 5–9211 (Pub Jan. 1993).*

* cited by examiner

*Primary Examiner*—Janis L. Dote
(74) *Attorney, Agent, or Firm*—Oblon, Spivak, McClelland, Maier & Neustadt, P.C.

(57) ABSTRACT

The object of the present invention is to provide new resins having excellent compatibility with other resins, in addition to a low melting temperature, and a low viscosity, and to provide a toner which can be fixed at low temperature without losing its shelf life, and showing an offset phenomenon, and have an excellent fixing strength to a transfer paper by using the improved olefin resin as a binder resin; these objects can be achieved by an olefin resin which is a copolymer of an α—olefin and at least one constituent selected from the group consisting of maleic anhydride and maleate, wherein said at least one constituent selected from the group consisting of maleic anhydride and maleate is crosslinked, and by rev toners comprising the same.

8 Claims, No Drawings

OLEFINIC RESIN AND ELECTROPHOTOGRAPHIC TONER PREPARED THEREFROM

DESCRIPTION OF THE RELATED ART

The present invention relates to an olefin resin having low melting temperature for obtaining a good fixing property at low temperature, improved compatibility and strength, and to a toner comprising the same which is used in printers or copying machines utilizing heat-roll fixing.

BACKGROUND OF THE INVENTION

Recently, various improvements or modifications on coelectrophotography machines or printers utilizing electrophotography have been desired as these machines have become more popular. For example, it has been desired to reduce energy consumption in order for these machines to be practical for home use. It is also desirable to make the machines run at high speeds in order to promote the spread of the machines into so called gray areas between printers and copiers. It is also necessary to simplify the structure of the machine in order to reduce the cost of the machines. Moreover, it has become popular to use the machines having functions of printing on both sides of the printed sheet and delivering the printed sheet automatically. Of the above-described requirements, particularly desired is a toner for electrophotography (hereafter, referred to simply as "toner") having a lower fixing temperature, a good anti-offset quality and fixing strength so that spots are not generated in a printed sheet in printing both sides of the printed sheet.

Polyolefines having a low molecular weight have generally excellent cold resistance, heat resistance, chemical resistance, abrasion resistance, and the like; therefore, they have been used as workability improvers for rubbers and plastics, dispersing agents for printing inks, abrasion resistance improvers, blocking resistance improvers, lustering agents, removers, electrical insulating materials, preservatives, and the like.

In an electrophotography field, polyolefins has received much attention as a remover among these uses; therefore, polyolefins are widely used to prevent the offset phenomenon of toners used in printers or copiers.

Moreover, in general, a polyolefin is easily handled, because its viscosity is low when it is melted. On the other hand, its compatibility with other resins and with solvents is poor; therefore, it has been desired to improve its compatibility.

Concretely, when an olefin resin is used alone in a binder resin comprising a toner as a main component, it is difficult to obtain both an anti-offset property and good fixing property. Therefore, it is impossible to use only olefin resin as a binder resin of a toner. Accordingly, when olefin resins such as styrene-acrylic copolymer and polyester resin are used as a binder resin, a remover should be mixed in at a range of 1 to 10 weight % with regard to the amount of olefin resin. However, the remover cannot be uniformly dispersed into the binder resin.

In order to solve this problem, it is suggested to improve the compatibility of olefin resin with other resins by copolymerization of olefin monomer and polar monomer, oxidative deconstituent of polyolefin, introduction of polar group by chemical denaturation, and the like.

A certain degree of its compatibility and dispersibility can be improved by introducing a polar group into polyolefin. However, it is difficult to obtain such an effect for some kinds of polyolefin.

Problems to be solved

Therefore, it is an object of the present invention to provide new olefin resin having excellent compatibility with other resins, in addition to a low melting temperature, and a low viscosity by improving conventional olefin resins. Moreover, it is also an object of the present invention to provide a toner having no offset phenomenon, and excellent fixing strength to a transfer paper by using the improved olefin resin as a binder resin of a toner.

SUMMARY OF THE INVENTION

The present invention relates to an olefin resin which is a copolymer of α—olefin and at least one constituent selected from the group consisting of maleic anhydride and maleate, wherein said at least one constituent selected from the group consisting of maleic anhydride and maleate is crosslinked.

Specifically, a first embodiment of the present invention is an olefin resin which is a copolymer of α—olefin and at least one constituent selected from the group consisting of maleic anhydride and maleate, wherein said at least one constituent selected from the group consisting of maleic anhydride and maleate is partially or entirely crosslinked with bivalent or greater valent epoxy compound, and a toner comprising the same.

A second embodiment of the present invention is an olefin resin which is a copolymer of α—olefin and at least one constituent selected from the group consisting of maleic anhydride and maleate, wherein said at least one constituent selected from the group consisting of maleic anhydride and maleate is partially or entirely crosslinked with at least one constituent selected from the group consisting of diols and trivalent or greater valent polyols, and a toner comprising the same.

A third embodiment of the present invention is an olefin resin which is a copolymer of α—olefin and at least one constituent selected from the group consisting of maleic anhydride and maleate, wherein said at least one constituent selected from the group consisting of maleic anhydride and maleate is partially or entirely crosslinked with amino compound and/or partially or entirely added amino compound by amidification reaction, and a toner comprising the same.

In the first olefin resin, an ester bond is introduced into the copolymer by a crosslinking reaction. As a result, the compatibility of the first olefin resin with other resins can be improved while a low melting temperature is maintained. The improvement of the compatibility of the first olefin resin means an improvement of the brittleness thereof. Therefore, when the first olefin resin is used as a binder resin of the toners, the brittleness of the toners can be improved while a low melting temperature, a low temperature fixing property, an anti-offset property, and a good shelf life are maintained.

An α—olefin having 22 or less carbon atoms is preferable for the monomer used in ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-hexadecene, 1-octadecene, 1-eicocene, and 1-dococene.

An alkyl ester having 20 or less carbon atoms represented by the following formula (3) is suitable for the maleate used in the first olefin resin. For example, low dialkyl esters such as dimethyl maleate, diethyl maleate, and dibutyl maleate are preferable.

The epoxy compound has preferably 2 or greater epoxy groups. Epoxy compounds having 2 or greater epoxy groups include, for example, but are not limited to, ethylene glycol diglycidyl ether, polyethylene glycol diglycidyl ether, polypropylene glycol diglycidyl ether, 1,4-butane diol diglycidyl ether, 1,6-hexane diol diglycidyl ether, 1,8-octane diol diglycidyl ether, glycerin diglycidyl ether, diglycidyl phthalate, glycidyl methacrylate, diglycidyl hydantoin, neopentyl glycol diglycidyl ether, trimethylol propane triglycidyl ether, glycerol polyglycidyl ether, sorbitol polyglycidyl ether, alkyl phenol diglycidyl ether, 1,2-cyclohexane diglycidyl dicarboxylate, glycidyl amine epoxide, bisphenol A type epoxy resin, hydrogenated bisphenol A type epoxy resin, brominated bisphenol type epoxy resin, phenol novolak type epoxy resin, cresol novolak type epoxy resin, brominated novolak type epoxy resin, bisphenol F type epoxy resin, tetramethyl bisphenol type epoxy resin, bisphenol S type epoxy resin, and alicyclic epoxy resins.

Aliphatic diglycidyl ethers and aliphatic polyglycol glycidyl ethers are preferable among these epoxy compounds. In particular, aliphatic diglycidyl ethers having an alkylene chain having 2 to 10 carbon atoms other than those comprising a diglycidyl ether group are most preferable. In addition, aliphatic polyglycol glycidyl ethers comprising 1 to 100 repeating glycol units are also most preferable.

Moreover, bisphenol A type epoxy resin, hydrogenated bisphenol A type epoxy resin, phenol novolak type epoxy resin, and cresol novolak type epoxy resin are preferable among these bivalent or greater valent epoxy compounds. In particular, bisphenol A type epoxy resin and hydrogenated bisphenol A type epoxy resin of which an epoxy equivalent is 1200 g/eq or less are preferable. When the epoxy equivalent is more than 1200 g/eq, the hydroxyl value of the epoxy resin is large, a large number of hydroxyl groups remains in the crosslinked olefin resin, and the obtained olefin resin easily absorbs a moisture. In addition, when the obtained olefin resin is used in toners, the electrification property of the toners is changed easily depending on an environment.

The phenol novolak type epoxy resin and cresol novolak type epoxy resin of which an epoxy equivalent is 250 g/eq or less are preferable. When the epoxy equivalent is more than 250 g/eq, the number of epoxy groups is large, the crosslinking density becomes large, and the melting temperature of the crosslinked olefin resin becomes high. Therefore, when the obtained olefin resin is used in toners, the toners have a poor low temperature fixing property.

The copolymer according to the present invention comprises the aforementioned monomers, that is, α—olefin and maleic anhydride, α—olefin and maleate, or α—olefin, maleic anhydride, and maleate.

In the present invention, any copolymer comprised of these combinations of monomers can be used; although the copolymer preferably comprises a structural unit A represented by the formula (1)

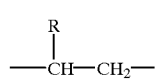

(1)

(wherein, R represents a hydrogen atom or an alkyl group having 1 to 20 carbon atoms) and a structural unit B represented by the formula (2)

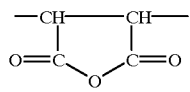

(2)

and/or the formula (3).

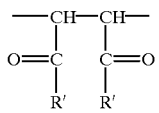

(3)

(wherein, R' represents an alkoxyl group having 1 to 20 carbon atoms)

Copolymers comprising the structural units A and B at a mol ratio of 20:80 to 80:20 have a low melting temperature and excellent compatibility with other resins; therefore, they are more preferable among the copolymers represented by the formulae (1) and (2) and/or (3). Moreover, when the copolymer is used in toners, the toners have a low temperature fixing property, an anti-offset property, and a good shelf life.

Copolymer comprising α—olefin and at least one compound selected from the group consisting of maleic anhydride and maleate, in which a first heat absorbing peak temperature appears at 60 to 120° C. when it is put into a Differential Scanning Calorimeter (DSC, marketed by SEIKO Electronic Industry Co., Ltd.; trade name; DSC-120) at 10 to 200° C., is preferable. Moreover, the copolymer having a first heat absorbing peak temperature at 70 to 100° C. is more preferable. When the copolymer having a first heat absorbing peak temperature at less than 60° C. is used in toners, the toners have a poor shelf life. In contrast, when the copolymer having a first heat absorbing peak temperature at more than 120° C. is used in toners, it is difficult for the toner to be fixed at low temperature.

A polymerization degree of the copolymer used in the present invention can be calculated from the molecular weight measured by GPC and the mixing proportion between α—olefin and at least one compound selected from the group consisting of maleic anhydride and maleate.

The polymerization degree of the copolymer is preferably in a range of 20 to 150. When the polymerization degree is less than 20, the strength of the obtained resin is extremely low; therefore, sufficient strength can be obtained by a crosslinking reaction. In addition, when the copolymer is used in toners, the toners have a poor shelf life. In contrast, when the polymerization degree is more than 150, the obtained resin has a high melting temperature and a high viscosity. In addition, when the copolymer is used in toners, the toners have a poor low temperature fixing property.

In order to obtain olefin resin having a low melting temperature, a low melt viscosity, and a good strength, the resin is crosslinked to the extent of 5 to 100 mol %, preferably 5 to 80 mol % of the maleic anhydride or maleate ester sites in the olefin resin.

When the copolymer is prepared, the copolymerization reaction is preferably proceeded in a solvent in the presence of a catalyst such as titanium chloride and triethyl ammonium. When the α—olefin is in a gas state, it is preferably to uniformly maintain the pressure inside of the reaction system.

The first olefin resin of the present invention can be prepared by mixing the copolymer and bivalent or greater valent epoxy compound, crosslinking at least one compound selected from the group consisting of maleic anhydride and maleate, and epoxy group of the bivalent or greater valent epoxy compound, thereby, a crosslinked polymer can be obtained.

The percentage content of the bivalent or greater valent epoxy compound is preferably in a range of 5 to 100 mol %, and more preferably in a range of 10 to 80 mol % with regard to the amount of maleic anhydride monomer and maleate monomer. When the percentage content is less than 5 mol %, the introduction of the ester bond does not proceed sufficiently; therefore, the effect for improving the compatibility cannot be obtained. In addition, when the obtained olefin resin is used in toners, the toners may have a poor durability and a poor anti-offset property, because crosslinking does not proceeded sufficiently. When the first olefin resin is prepared without a catalyst, the reaction temperature should be maintained at more than 100° C., and long reaction periods are required. However, the reaction temperature can be lowered and the reaction periods can be reduced by adding a catalyst such as benzyl dimethyl amine and lauryl alcohol, in accordance with the instituents of the epoxy compound used in production or with the desired crosslinking degree of the olefin resin.

As explained above, the at least one compound selected from the group consisting of maleic anhydride and maleate is crosslinked with at least one compound selected from the group consisting of diol and trivalent or greater valent polyol in the second olefin resin of the present invention.

When these compounds are crosslinked, an ester bond is introduced into the copolymer. As a result, it is possible to improve the compatibility of the second olefin resin with other resins in which conventional olefin resins does not readily dissolve, while maintaining a low melting temperature. When the second olefin resin is used as a binder resin of toners, the brittleness of the toners can be improved while a low melting temperature is maintained. In addition, the toners have a low temperature fixing property, an anti-offset property, and a good shelf life.

The same monomers such as α—olefin, maleic anhydride and maleate as used in the first olefin resin can be used in the second olefin resin. In addition, the same copolymer comprising these monomers as used in the first olefin resin can also be used.

Diols comprising the second olefin resin include, for example, but are not limited to, diethanol amine, ethylene glycol, diethylene glycol, triethylene glycol, propylene glycol, isopylene glycol, octane diol, 2,2-diethyl-1,3-propane diol, spiro glycol, neopentyl glycol, 1,3-butane diol, 1,4-butane diol, 2-butyl-2-ethyl-1,3-propane diol, 1,6-hexane diol, hexylene glycol, polyethylene glycol, polypropylene glycol, polytetramethylene glycol, 1, 2-dodecane diol, 1,12-dodecane diol, 1,16-hexadecane diol, 1,5-pentane diol, 3-methyl-1,5-pentane diol, cyclohexane diol, bis(β—hydroxyethyl) terephthalate, bis(hydroxybutyl) terephtalate, polyoxyethylene bisphenol A, polyoxypropylene bisphenol A, polyoxyethylene bisphenol, and polyoxypropylene bisphenol.

An aliphatic diol having a long chain is more preferable among these diols. "Long chain" means a chain comprising 12 to 50 carbon atoms, and preferably 12 to 30 carbon atoms. When the number of carbon atoms is less than 12, a sufficient low temperature fixing property may not be obtained. In contrast, when the number of carbon atoms is more than 50, the obtained olefin resin is used in toners, the storage stability of the toners may be damaged.

Trivalent or greater valent polyols include, but are not limited to, sorbitol, 1,2,3, 6-hexanetetrol, 1,4-sorbitan, pentaerythritol, dipentaerythritol, tripentaerythritol, 1,2,4-butane triol, 1,2,5-pentane triol, 3-methyl-1,3,5-pentaerythritol, glycerol, diglycerol, 2-methylpropane triol, 2-methyl-1,2,4-butane triol, trimethyolethane, trimethylolpropane, 1,3,5-trihydroxy benzene, polyvinyl alcohol, and polyethylene vinyl alcohol.

When polyoxyalkylene glycol is used, the molecular weight thereof is preferably in a range of 200 to 10,000, and more preferably in a range of 400 to 2,000. When the obtained olefin resin comprising polyoxyalkylene glycol having a molecular weight of less than 200 is used in toners, the toners may not have a low temperature fixing property. In contrast, the molecular weight is more than 10,000, the shelf life of the obtained toners may be damaged.

Polyoxyalkylene bisphenot A is preferable among these aromatic diols.

The second olefin resin of the present invention can be prepared by mixing the copolymer and at least one compound selected from the group consisting of diol and trivalent or greater valent polyol. Then, at least one compound selected from the group consisting of maleic anhydride and maleate and at least one compound selected from the group consisting of diol and trivalent or greater valent polyol are esterified and/or ester interchanged in the same way as a conventional estrification reaction. Thereby, a crosslinking is formed in the resin, and the second olefin resin can be obtained.

A percentage content of the at least one compound selected from the group consisting of diol and trivalent or greater valent polyol is preferably in a range of 5 to 100 mol %, and more preferably in a range of 10 to 80 mol % with regard to the amount of maleic anhydride monomer and maleate monomer. When the percentage content is less than 5 mol %, an introduction of the ester bond does not proceed sufficiently; therefore, the effect for improving the compatibility cannot be obtained. In addition, when the obtained olefin resin is used in toners, the toners may have poor durability and anti-offset property, because crosslinking does not proceed sufficiently.

As explained above, the amino compound is amidified, that is, is added to and/or crosslinked with the at least one compound selected from the group consisting of maleic anhydride and maleate in the third olefin resin of the present invention. An amide bond is introduced into the copolymer by the amidification reaction. A hydrogen bond originating in an amide bonds improves the brittleness of the olefin resin while a low melting temperature is maintained. When the third olefin resin is used as a binder resin of toners, the toners have a low temperature fixing property, an anti-offset property, and a good shelf life.

The third olefin resin of the present invention comprises one or greater structures represented by the following formulae (4), (5), (6), and (7)

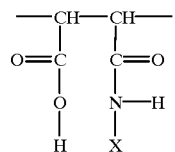

(4)

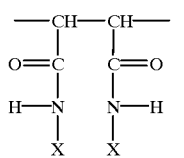

(5)

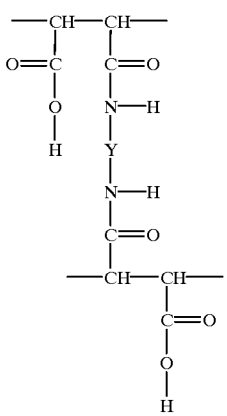

(6)

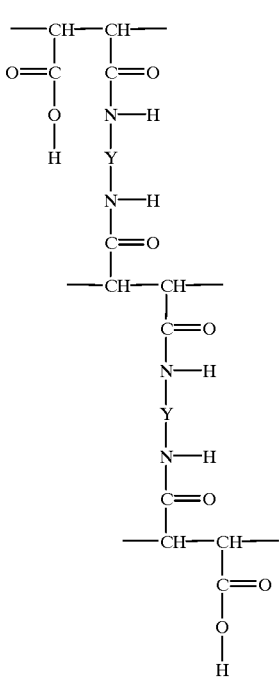

(7)

(wherein, X and Y represent a structural unit other than an amino group of an amino compound)

The same monomer such as α—olefin, maleic anhydride, and maleate as used in the first olefin resin can be used in the third olefin resin. In addition, the same copolymer comprising these monomers as used in the first olefin resin can also be used.

The amino compounds include, for example, but are not limited to, aliphatic amino compounds such as 1-amino propane, 1-amino butane, 2-amino-2-butyl propane, 3-(dimethyl)propyl amine, 3-methoxypropyl amine, 1-amino pentane, 1-amino hexane, 1-amino heptane, 1-amino octane, 1-amino decane, 1-amino dodecane, 1-amino hexadecane, 2-ethyl hexyl amine, stearyl amine, lauryl amine, 3-amino-1-propanol, 4-amino-1-butanol, 6-amino-1-hexanol, ethylene diamine, 1,2-diamino propane, 1,3-diamino-2,2-dimethyl propane, 1,4-diamino butane, 1,3-diamino pentane, 1,5-diamino pentane, 1,6-diamino hexane, 1,7-diamino heptane, 1,8-diamino octane, 1,8-diamino-3,6-dioxa octane, 1,9-diamino nonane, 1,10-diamino decane, 1,11-diamino undecane, 1,12-diamino dodecane, polyethylene diamine, polypropylene diamine, diethylene tetramine, propylene diamine, dipropylene triamine, diethylene triamine, tetraethylene pentamine, m-hexamethylene-triamine, hexamethylene-tetramine, bis-aminopropyl piperazine, polyoxyethylene diamine, and polyoxypropylene diamine.

The aromatic amino compounds include, for example, but are not limited to, aniline, p-amino acetanilide, p-aminobenzoic acid, p-amino ethyl benzoate, o-amino phenol, m-amino phenol, p-amino phenol, p-amino benzaldehyde, o-phenylene diamine, m-phenylene diamine, p-phenylene diamine, 1,2-diamino anthraquinone, 1,4-diamino anthraquinone, 1,5-diamino anthraquinone, 3,4-diaminobenzoic acid, 3,5-diaminobenzoic acid, 3,3'-diamino benzophenone, 3,4-diamino benzophenone, 4,4'-diamino benzophenone, 2,2'-ethylene dianiline, 4,4'-ethylene dianiline, 4,4'-diamino-2,2'-bis(trifluoromethyl) biphenyl-1,3,6-diamino carbazole, 2,4-diamino chlorobenzene, 2,5-diamino chlorobenzene, 3,5-diamino chlorobenzene, 2,4-diamino benzene, 2,5-diamino-4-chlorotoluene, 2,4-diamino-6-chloropyrimidine, 2,4-diamino-6-chloro-1,3,5-triazine, 4,4'-diamino-3,3'-dichlorodiphenyl methane, 4,4'-diamino-3,3'-dimethyl diphenyl methane, 3,3'-diamino4,4'-dihydroxybiphenyl, 4,4'-diamino-3,3'-dihydroxybiphenyl, 4,4'-diamino-3,3'-diethyl-5,5'-dimethyl diphenyl methane, 4,4'-diamino-2,2'-dimethyl bibenzyl, 2,4-diamino diphenyl amine, 4,4'-diamino-1,2-diphenyl ethane, 4,4'-diamino diphenyl ether, 3,4'-diamino diphenyl ether, 3,4'-diamino diphenyl methane, 2,7-diamino fluorene, 1,5-diamino naphthalene, 1,8-diamino naphthalene, 1,2-diamino-4-nitrobenzene, 1,3-diamino xylene, diamino diphenyl sulfone, 3,3'-diamino benzidine, and 2,4'-diamino- 6-dimethyl amino-1,3,5-triazine.

The alicyclic amino compounds include, for example, but are not limited to, 1,2-cyclohexane diamine, 1,3-cyclohexane diamine, 1,4-cyclohexane diamine, 4,4'-diamino dicyclohexyl methane, 1,4-diamino methyl cyclohexane, and isophoronediamine.

The denaturated compounds of the aliphatic amino compounds, aromatic amino compounds, and alicyclic amino compounds can also be used.

In addition, a polyamide resin can be used as the amino compound. For example, an aliphatic polyamide resin having an amino group at at least one terminal end, which is prepared by a polycondensation of diamine and dicarboxylic acid can be used as the amino compound. The aliphatic polyamide resins include, for example, but are not limited to, nylon 66, nylon 610, nylon 612, 8-type nylon, polyethyleneoxy nylon, amorphous nylon (transparent nylon), polyamide resin dissolved in alcohol, polymerization fatty acid polyamide resin, liquid polyamide resin, denaturated aliphatic polyamide resin, amino polyamide resin, and polyamide amine which is a condensation material prepared by dimeric acid (dimer fatty acid) and aliphatic polyamine.

An amino compound having 2 or greater functional groups is preferable among these amino compounds, because such amino compound can easily form a crosslinking structure, and can remarkably improve a strength of the resin. In particular, the aliphatic amino compound can form crosslinking without failing a low melting temperature and a low melting viscosity which are characteristics of an olefin resin; therefore, the aliphatic amino compound is preferable among these amino compounds.

Moreover, the aliphatic polyamide resin can also be used as the aliphatic amino compound. In particular, the aliphatic polyamide resin having an amine value of 20 to 500 mg KOH is preferable. When the amine value is less than 20 mg KOH, the number of reaction points, that is, terminal amino groups, is insufficient, the reactivity of the copolymer comprising α—olefin and at least one compound selected from the group consisting of maleic anhydride and maleate decreases; therefore, it is impossible to obtain an effect for improving the strength of the resin by crosslinking. In contrast, when the amine value is more than 500 mg KOH, it is difficult to control the crosslinking reaction, and the crosslinking reaction proceeds excessively. Then, the crosslinked olefin resin has a high melt starting temperature and a high melting viscosity. That is, a low melting temperature and a low melting viscosity which are characteristics of an olefin resin cannot be obtained, and it is difficult to obtain desired properties.

The third olefin resin of the present invention can be prepared by mixing the copolymer and the amino compound, and reacting at least one compound selected from the group consisting of maleic anhydride and maleate, and an amino group of the amino compound, thereby, an amide bond can be formed.

The content of the amino compound is preferably in a range of 5 to 80 mol % and more preferably in a range of 10 to 50 mol % with regard to the amount of maleic anhydride monomer and maleate monomer. When the content is less than 5 mol %, introduction of an amide bond does not proceed sufficiently. In addition, when the obtained olefin resin is used in toners, the toners may have poor durability and anti-offset property. In contrast, when the content is more than 80 mol %, the binding power of hydrogen bonds originating in amide bonds is too large, the obtained resin is toughened; therefore, problems such as deterioration of grindability, increase in the melt starting temperature and increase in melting viscosity occur, and then the characteristics of the olefin resin may cannot be obtained. In addition, when the third olefin resin is used as a binder resin of toners, the toners may have poor handling property and low temperature fixing property.

Moreover, "first absorbing peak" in the present specification is measured in accordance with ASTM D-3418-82. Specifically, 10 to 15 mg of sample is pick up, heated under a nitrogen atmosphere from room temperature to 200° C. at temperature rising speed of 10° C./min, maintained the temperature 200° C. for 10 minutes, cooled down rapidly, maintained the temperature 10° C. for 10 minutes, and heated under a nitrogen atmosphere from room temperature to 200° C. at temperature rising speed of 10° C./min. "First peak absorbing peak" is defined as a first peak temperature when a sample is heated to 200° C. for the second time.

A molecular weight of the copolymer is measured by Gel Permeation Chromatography (GPC).

Moreover, a known method is employed to measure a molecular weight. Measurements can be made under the following conditions using gel permeation chromatography. Namely, a solvent chloroform at 25° C. is made to flow at a speed of 1 ml per minute and 8 mg of a chloroform sample solvent having a density of 0.4 gr/dl is poured in as a sample weight, and measurements are made. Further, when the molecular weight of the sample is measured, the measurement conditions are selected so that the molecular weight distribution of each samples is in the linear part of a standard curve obtained from some kinds of simple dispersing polystyrene standard samples. Moreover, under the measuring conditions, Mw/Mn of NBS 706 polystyrene standard sample ($Mw=28.8\times10^4$, $Mn=1.37\times10^4$, $Mw/Mn=2.11$) was 2.11±0.10. Therefore, the reliability of the result was confirmed.

In the following, the toners of the present invention will be presented.

The first, second, and third olefin resin are used as a binder resin of the toners.

The olefin resins of the present invention have preferably the aforementioned compositions and properties. In addition, a melt starting temperature of the olefins is preferably in a range of 60 to 120° C., and more preferably in a range of 70 to 100° C. When the melt starting temperature is less than 60° C., a shelf life of the toners is damaged. In contrast, when the melt starting temperature is more than 120° C., a low temperature fixing property of the toners is damaged. In order to set up a melt starting temperature of the olefin resin in this range, it had better to control the composition of the olefin resin and the conditions of a crosslinking reaction.

A melt starting temperature in the present specification is measured using a flow tester CFT-500 manufactured by SHIMAZU SEISAKUJYO, measuring conditions are as follows:

plunger: 1 $cm^2$ diameter of dye: 1 mm length of dye: 1 mm load: 20 kgF preliminary heating temperature range: 50 to 80° C.

preliminary heating periods: 300 sec temperature increase speed of 6° C./min.

The toners of the present invention can be obtained by adding other resins, a magnetic powder, a charge controlling agent, and other additives, if need, to the binder resin; mixing with a super mixer, melting and kneading with a uniaxial compression kneading machine, a bi-axial compression kneading machine, an extruder, a roll mixer, a Danbury mixer, or a pressure needer; pulverizing with a jet mill; and classifying with a wind power classifier.

The binder resins in company with the above-mentioned olefin resins include, but are not limited to, styrene resins, styrene-acrylic copolymer resin, polyester resins, polyethylene resins, epoxy resins, silicon resins, polyamide resins, and polyurethane resins.

When these resins are used in addition to the olefin resin, the mixing ratio is preferable less than 50 weight % for a low temperature fixing property, an anti-offset property, and a shelf life.

The pigments used in the toners of the present invention include, but are not limited to, carbon black, aniline blue, phtalocyanine blue, quinine yellow, malachite green, lamp black, Rohdamine-B, and quinacridone.

The charge controlling agents include, but are not limited to, positive charge controlling agents such as ammonium salt, pyridinium salt, and azine; and negative charge controlling agents such as chromium complex and iron complex. The positive charge controlling agents are added to the toner at 0.1 to 10 weight % with regard to the binder resin. When the negative charging agent is added to the toners, and the toners are remarkably negatively charged, it is possible to neutralize with the positive charge controlling agents.

The olefin resins of the present invention have an excellent remove property; therefore, it is not necessary to use a remover such as waxes. However, it is possible to use a remover to the toners of the present invention.

The magnetic powders include, but are not limited to, metals having strong magnetic properties, such as ferrites, magnetite, iron, cobalt, nickel, alloys thereof, and the compounds comprised these elements; alloy which does not comprised strong magnetic elements but shows the strong magnetic properties when preferable heat treatment is performed, such as Hustler's alloy comprising Mn or Cu such as Mn-Cu-Al, Mn-Cu-Sn, chromium dioxide, and the like.

These magnetic powders are dispersed in the binder resin in a form of an average particle size of 0.1 to 1 micron. The adding amount of the magnetic powders is 20 to 70 weight parts with regard to 100 weight parts of the toners, and more preferable 40 to 70 weight parts.

The toners of the present invention are used to a two-component developer prepared by mixing carriers such as ferrite powder and iron powder. When the magnetic powder is added to the toners, the toners can be used as a one-component developer for an electrostatic charged image without mixing carriers. In addition, the toners of the present invention are also used to a non-magnetic one-component developing method.

Moreover, the toners of the present invention can be simultaneously prepared with a preparation of the olefin resins by using the melt-kneading machine as a reactor, and controlling the kneading temperature and periods; thereby a crosslinking reaction is carried out.

EXPERIMENTAL EXAMPLES

The olefin resins and the toners comprising the same of the present invention will be explained in detail hereinbelow with reference to the Synthesis Examples, Comparative Synthesis Examples, Examples, and Comparative Examples. However, the present invention is not limited to these Examples. Moreover, in these Examples, "parts" means "parts by weight".

Synthesis Example 1

500 g of copolymer (molecular weight: 10,000; first heat absorbing peak temperature: 73° C.; saponification value: 421.9 mg KOH/g) comprising 1-dodecene and maleic anhydride at a mole ratio of 1:1, and 200 g (corresponding to 6.3 mol % of maleic anhydride) of bisphenol A type epoxy resin (marketed by YUKA SHELL EPOXY Co., Ltd.; trade name: EPICOAT 1055; epoxy equivalent: 850 g/eq) were put into a 2 liter-flask having four inlet portions provided with a thermometer, an agitator, a condenser, and an inlet for nitrogen gas. The olefin resin (A) of the present Synthesis Example was obtained by reacting the mixture while introducing nitrogen gas from the inlet, heating the mixture using a mantle heater at 160° C. for 1 hour and taking out the obtained melted resin.

The melt starting temperature of the obtained olefin resin (A) was 75° C.

Synthesis Example 2

The olefin resin (B) was obtained identically to that of Synthesis Example 1 of the present invention, except that 500 g of copolymer (molecular weight: 12,000; first heat absorbing peak temperature: 78° C; saponification value: 170.5 mg KOH/g) comprising 1-eicocene and maleic anhydride at a mole ratio of 2:1, and 150 g (corresponding to 19.7 mol % of maleic anhydride) of hydrogenated bisphenol A type epoxy resin (marketed by TOHTO KASEI Co., Ltd.; trade name: EPOTOHTO ST-5100; epoxy equivalent: 1000 g/eq) were put into a 2 liter-flask having four inlet portions.

The melt starting temperature of the obtained olefin resin (B) was 80° C.

Synthesis Example 3

The olefin resin (C) was obtained identically to that of Synthesis Example 1 of the present invention, except that 500 g of copolymer (molecular weight: 9,500; first heat absorbing peak temperature: 72° C.; saponification value: 304.9 mg KOH/g) comprising 1-hexadecene and dimethyl maleate at a mole ratio of 1:1, and 100 g (molecular weight: 1,000; corresponding to 7.4 mol % of dimethyl maleate) of polyethylene glycol diglycidyl ether were put into a 2 liter-flask having four inlet portions.

The melt starting temperature of the obtained olefin resin (C) was 73° C.

Synthesis Example 4

The olefin resin (D) was obtained identically to that of Synthesis Example 1 of the present invention, except that 500 g of copolymer (molecular weight: 9,800; first heat absorbing peak temperature: 70° C.; ester value: 407.8 mg KOH/g) comprising 1-octadecene and diethyl maleate at a mole ratio of 1:2.5, and 64.5 g (0.25 mol; corresponding to 13.8 mol % of diethyl maleate) of 1,8-octane diol diglycidyl ether were put into a 2 liter-flask having four inlet portions.

The melt starting temperature of the obtained olefin resin (D) was 74° C.

Synthesis Example 5

The olefin resin (E) was obtained identically to that of Synthesis Example 1 of the present invention, except that 500 g of copolymer (molecular weight: 6,500; first heat absorbing peak temperature: 80° C.; saponification value: 421.9 mg KOH/g) comprising 1-butene and maleic anhydride at a mole ratio of 3:1, and 42 g (corresponding to 5.3 mol % of maleic anhydride) of cresol novolak type epoxy resin (marketed by TOHTO KASEI Co., Ltd.; trade name: EPOTOHTO YDCN 702; epoxy equivalent: 210 g/eq ) were put into a 2 liter-flask having four inlet portions.

The melt starting temperature of the obtained olefin resin (E) was 83° C.

Synthesis Example 6

The olefin resin (F) was obtained identically to that of Synthesis Example 1 of the present invention, except that 500 g of copolymer (molecular weight: 9,800; first heat absorbing peak temperature: 72° C.; saponification value: 168.2 mg KOH/g) comprising 1-hexadecene, maleic anhydride, and dioctyl maleate at a mole ratio of 4:1:1, and 46 g (corresponding to 13.3 mol % of the total amount of maleic anhydride and dioctyl maleate) of hydrogenated bisphenol A type epoxy resin (marketed by TOHTO KASEI Co., Ltd.; trade name: EPOTOHTO ST-3000; epoxy equivalent: 230 g/eq ) were put into a 2 liter-flask having four inlet portions.

The melt starting temperature of the obtained olefin resin (F) was 76° C.

Synthesis Example 7

The olefin resin (G) was obtained identically to that of Synthesis Example 1 of the present invention, except that 500 g of copolymer (molecular weight: 10,000; first heat absorbing peak temperature: 73° C.; ester value: 159.4 mg KOH/g) comprising 1-eicocene and dimethyl maleate at a mole ratio of 2:1, and 40 g (corresponding to 14.1 mol % of dimethyl maleate) of phenol novolak type epoxy resin (marketed by Dainippon Ink and Chemicals Inc.; trade name: EPICHRON N-865; epoxy equivalent: 200 g/eq ) were put into a 2 liter-flask having four inlet portions.

The melt starting temperature of the obtained olefin resin (G) was 73° C.

Synthesis Example 8

500 g of copolymer (molecular weight: 10,000; first heat absorbing peak temperature: 73° C.; saponification value: 421.9 mg KOH/g) comprising 1-dodecene and maleic anhydride at a mole ratio of 1:1, and 73.5 g (0.285 mol; corresponding to 15.2 mol % of maleic anhydride) of 1,16-hexadecane diol were put into a 2 liter-flask having four inlet portions provided with a thermometer, an agitator, a condenser, and an inlet for nitrogen gas. The olefin resin (H) of the present Synthesis Example was obtained by reacting the mixture while introducing nitrogen gas from the inlet, heating the mixture using a mantle heater at 180° C. for 3 hours, rising the reaction temperature to 200° C. for 1 hour, stirring for 2 hours while heating, taking out the obtained melted resin, and cooling at room temperature.

The melt starting temperature of the obtained olefin resin (H) was 74° C.

Synthesis Example 9

The olefin resin (I) was obtained identically to that of Synthesis Example 8 of the present invention, except that 500 g of copolymer (molecular weight: 12,000; first heat absorbing peak temperature: 78° C.; saponification value: 170.5 mg KOH/g) comprising 1-eicocene, and maleic anhydride at a mole ratio of 2:1, and 380 g (molecular weight: 1,000; hydroxyl value: 112.2 mg KOH/g corresponding to 50 mol % of maleic anhydride) of polyethylene glycol were put into a 2 liter-flask having four inlet portions.

The melt starting temperature of the obtained olefin resin (I) was 78° C.

Synthesis Example 10

The olefin resin (J) was obtained identically to that of Synthesis Example 8 of the present invention, except that 500 g of copolymer (molecular weight: 9,500; first heat absorbing peak temperature: 72° C.; ester value: 304.9 mg KOH/g) comprising 1-hexadecene, and dimethyl maleate at a mole ratio of 1:1, and 183 g (molecular weight: 625; hydroxyl value: 180 mg KOH/g; corresponding to 21.6 mol % of dimethyl maleate) of polytetramethylene glycol were put into a 2 liter-flask having four inlet portions.

The melt starting temperature of the obtained olefin resin (J) was 73° C.

Synthesis Example 11

The olefin resin (K) was obtained identically to that of Synthesis Example 8 of the present invention, except that 500 g of copolymer (molecular weight: 9,800; first heat absorbing peak temperature: 70° C.; ester value: 411.4 mg KOH/g) comprising 1-octadecene, and diethyl maleate at a mole ratio of 1:2.5, and 101 g (0.25 mol; corresponding to 13.6 mol % of diethyl maleate) of bisphenol A ethyleneoxide-6 mol addition product were put into a 2 liter-flask having four inlet portions.

The melt starting temperature of the obtained olefin resin (K) was 71° C.

Synthesis Example 12

The olefin resin (L) was obtained identically to that of Synthesis Example 8 of the present invention, except that 500 g of copolymer (molecular weight: 6,500; first heat absorbing peak temperature: 80° C.; saponification value: 421.9 mg KOH/g) comprising 1-butene, and maleic anhydride at a mole ratio of 3:1, and 53.7 g (0.4 mol; corresponding to 31.9 mol % of maleic anhydride) of trimethylol propane were put into a 2 liter-flask having four inlet portions.

The melt starting temperature of the obtained olefin resin (L) was 81° C.

Synthesis Example 13

The olefin resin (M) was obtained identically to that of Synthesis Example 8 of the present invention, except that 500 g of copolymer (molecular weight: 9,800; first heat absorbing peak temperature: 72° C.; saponification value: 168.2 mg KOH/g) comprising 1-hexadecene, maleic anhydride, and dioctyl maleate at a mole ratio of 4:1:1, and 95 g (0.3 mol; corresponding to 40 mol % with regard to the total amount of maleic anhydride and dioctyl maleate) of bisphenol A ethyleneoxide-2 mol addition product were put into a 2 liter-flask having four inlet portions.

The melt starting temperature of the obtained olefin resin (M) was 72° C.

Synthesis Example 14

The olefin resin (N) was obtained identically to that of Synthesis Example 8 of the present invention, except that 500 g of copolymer (molecular weight: 10,000; first heat absorbing peak temperature: 73° C.; ester value: 159 mg KOH/g) comprising 1-eicocene, and dimethyl maleate at a mole ratio of 2:1, and 25 g (molecular weight: 1,000; hydroxyl value: 112.2 mg KOH/g; corresponding to 3.5 mol % of dimethyl maleate) of polytetramethylene glycol were put into a 2 liter-flask having four inlet portions.

The melt starting temperature of the obtained olefin resin (N) was 73° C.

Synthesis Example 15

500 g of copolymer (molecular weight: 10,000; first heat absorbing peak temperature: 73° C.; saponification value: 421.9 mg KOH/g) comprising 1-dodecene and maleic anhydride at a mole ratio of 1:1, and 57.1 g (0.285 mol; corresponding to 15.2 mol % of maleic anhydride) of 1,12-diamino dodecane were put into a 2 liter-flask having four inlet portions provided with a thermometer, an agitator, a condenser, and an inlet for nitrogen gas. The olefin resin (O) of the present Synthesis Example was obtained by reacting the mixture while introducing nitrogen gas from the inlet, heating the mixture using a mantle heater at 160° C. for 1 hour, and taking out the obtained melted resin.

The melt starting temperature of the obtained olefin resin (O) was 79° C.

Synthesis Example 16

The olefin resin (P) was obtained identically to that of Synthesis Example 15 of the present invention, except that 500 g of copolymer (molecular weight: 12,000; first heat absorbing peak temperature: 78° C.; saponification value: 170.5 mg KOH/g) comprising 1-eicocene, and maleic anhydride at a mole ratio of 2:1, and 15.8 g (0.18 mol; corresponding to 23.7 mol % of maleic anhydride) of 1,4-diamino butane were put into a 2 liter-flask having four inlet portions.

The melt starting temperature of the obtained olefin resin (P) was 80° C.

Synthesis Example 17

The olefin resin (Q) was obtained identically to that of Synthesis Example 15 of the present invention, except that 500 g of copolymer (molecular weight: 9,500; first heat absorbing peak temperature: 72° C.; ester value: 304.9 mg KOH/g) comprising 1-hexadecene, and dimethyl maleate at a mole ratio of 1:1, and 23.4 g (0.225 mol; corresponding to 16.6 mol % of dimethyl maleate) of p-phenylene diamine were put into a 2 liter-flask having four inlet portions.

The melt starting temperature of the obtained olefin resin (Q) was 73° C.

Synthesis Example 18

The olefin resin (R) was obtained identically to that of Synthesis Example 15 of the present invention, except that 500 g of copolymer (molecular weight: 9,800; first heat absorbing peak temperature: 70° C.; ester value: 407.8 mg KOH/g) comprising 1-octadecene, and diethyl maleate at a mole ratio of 1:2.5, and 52.6 g (0.25 mol; corresponding to 13.8 mol % of diethyl maleate) of 4,4'-diamino dicyclohexylmethane were put into a 2 liter-flask having four inlet portions.

The melt starting temperature of the obtained olefin resin (R) was 74° C.

Synthesis Example 19

The olefin resin (S) was obtained identically to that of Synthesis Example 15 of the present invention, except that 500 g of copolymer (molecular weight: 6,500; first heat absorbing peak temperature: 80° C.; saponification value: 421.9 mg KOH/g) comprising 1-butene, and maleic anhydride at a mole ratio of 3:1, and 90 g (corresponding to 14.9 mol % of maleic anhydride) of aliphatic polyamide resin (marketed by HENKEL HAKUSUI Co., Ltd.; trade name: BARSAMIDE 125; amine value: 350 mg KOH/g) were put into a 2 liter-flask having four inlet portions.

The melt starting temperature of the obtained olefin resin (S) was 83° C.

Synthesis Example 20

The olefin resin (T) was obtained identically to that of Synthesis Example 15 of the present invention, except that 500 g of copolymer (molecular weight: 10,000; first heat absorbing peak temperature: 75° C.; ester value: 330.1 mg KOH/g) comprising 1-dodecene, and diethyl maleate at a mole ratio of 1:1, and 241.5 g (1 mol; corresponding to 34 mol % of diethyl maleate) of 1-amino hexadecane were put into a 2 liter-flask having four inlet portions.

The melt starting temperature of the obtained olefin resin (T) was 70° C.

Comparative Synthesis Example 1

Comparative resin (a) was obtained identically to that of Synthesis Example 1, except that 500 g of copolymer (molecular weight: 5,000; saponification value: 555.5 mg KOH/g; glass transition temperature: 65° C.) comprising styrene, and maleic anhydride at a mole ratio of 1:1, and 240 g (corresponding to 5.2 mol % of maleic anhydride) of bisphenol A type epoxy resin (marketed by YUKA SHELL EPOXY Co., Ltd.; trade name: EPICOAT 1004; epoxy equivalent: 925 g/eq) were put into a 2 liter-flask having four inlet portions.

The melt starting temperature of the obtained resin (a) was 135° C.

Comparative Synthesis Example 2

Comparative resin (b) was obtained identically to that of Synthesis Example 1, except that 500 g of copolymer (molecular weight: 7,000; first heat absorbing peak temperature: 78° C.; acid value: 107.9 mg KOH/g) comprising 1-hexadecene, and acrylic acid at a mole ratio of 2:1, and 62 g (0.24 mol; corresponding to 50 mol % of acrylic acid) of 1,8-octane diol diglycidyl ether were put into a 2 liter-flask having four inlet portions.

The melt starting temperature of the obtained resin (b) was 79° C.

Comparative Synthesis Example 3

Comparative olefin resin (c) was obtained identically to that of Synthesis Example 1, except that 500 g of copolymer (molecular weight: 10,000; first heat absorbing peak temperature: 75° C.; ester value: 330.1 mg KOH/g) comprising 1-dodecene, and diethyl maleate at a mole ratio of 1:1, and 186.3 g (1 mol; corresponding to 34 mol % of diethyl maleate) of 2-ethyl hexyl glycidyl ether were put into a 2 liter-flask having four inlet portions.

The melt starting temperature of the obtained olefin resin (c) was 70° C.

Comparative Synthesis Example 4

Comparative resin (d) was obtained identically to that of Synthesis Example 8, except that 500 g of copolymer (molecular weight: 5,000; saponification value: 555.5 mg KOH/g; glass transition temperature: 65° C.) comprising styrene, and maleic anhydride at a mole ratio of 1:1, and 101 g (0.5 mol; corresponding to 20.2 mol % of maleic anhydride) of 1,12-dodecane diol were put into a 2 liter-flask having four inlet portions.

The melt starting temperature of the obtained resin (d) was 125° C.

Comparative Synthesis Example 5

Comparative resin (e) was obtained identically to that of Synthesis Example 8, except that 500 g of copolymer (molecular weight: 7,000; first absorbing peak: 78° C.; acid value: 107.9 mg KOH/g) comprising 1-hexadecene, and acrylic acid at a mole ratio of 2:1, and 35.1 g (0.24 mol; corresponding to 50 mol % of acrylic acid) of octane diol were put into a 2 liter-flask having four inlet portions.

The melt starting temperature of the obtained resin (e) was 79° C.

Comparative Synthesis Example 6

Comparative olefin resin (f) was obtained identically to that of Synthesis Example 8, except that 500 g of copolymer (molecular weight: 10,000; first absorbing peak: 73° C.; saponification value: 421.9 mg KOH/g) comprising 1-dodecene, and maleic anhydride at a mole ratio of 1:1, and 211.8 g (1.13 mol; corresponding to 30.1 mol % of maleic anhydride) of lauryl alcohol were put into a 2 liter-flask having four inlet portions.

The melt starting temperature of the obtained olefin resin (f) was 70° C.

Comparative Synthesis Example 7

Comparative resin (g) was obtained identically to that of Synthesis Example 15, except that 500 g of copolymer (molecular weight: 5,000; saponification value: 555.5 mg KOH/g; glass transition temperature: 65° C.) comprising styrene, and maleic anhydride at a mole ratio of 1:1, and 80.1 g (0.4 mol; corresponding to 16.2 mol % of maleic anhydride) of 1,12-diamino dodecane were put into a 2 liter-flask having four inlet portions.

The melt starting temperature of the obtained resin (g) was 135° C.

Comparative Synthesis Example 8

Comparative resin (h) was obtained identically to that of Synthesis Example 15, except that 500 g of copolymer (molecular weight: 7,000; first absorbing peak: 78° C.; acid value: 107.9 mg KOH/g) comprising 1-hexadecene, and acrylic acid at a mole ratio of 2:1, and 34.6 g (0.24 mol; corresponding to 50 mol % of acrylic acid) of 1,8-diamino octane were put into a 2 liter-flask having four inlet portions.

The melt starting temperature of the obtained resin (h) was 79° C.

The olefin resins prepared in Synthesis Examples and Comparative Synthesis Examples were mixed with other materials using a Super Mixer at following compositions. After melting and kneading the mixture, the particles having an average particle diameter of 11 μm were obtained by classifying. The negatively charged toner particles were prepared by adhering 0.3 parts of hydrophobic $SiO_2$ (marketed by AEROSIL Co., Ltd.; trade name: R-972) to the surface of the obtained classified particles, using a Herschel Mixer.

EXAMPLE 1

| | |
|---|---|
| resin A | 100 parts |
| carbon black | 6.5 parts |
| (marketed by MITSUBISHI CHEMICAL INDUSTRIES Co., Ltd. Trade name: MA-100) | |
| chromium complex salt dye | 2 parts |
| (marketed by HODOGAYA CHEMICAL INDUSTRIES Co., Ltd. Trade name: TRH) | |

EXAMPLE 2

| | |
|---|---|
| resin B | 100 parts |
| carbon black | 6.5 parts |
| (marketed by MITSUBISHI CHEMICAL INDUSTRIES Co., Ltd. Trade name: MA-600) | |
| chromium complex salt dye | 2 parts |
| (marketed by ORIENT CHEMICAL INDUSTRIES Co., Ltd. Trade name: BONTRON S-34) | |

EXAMPLE 3

| | |
|---|---|
| resin C | 100 parts |
| carbon black | 6.5 parts |
| (marketed by MITSUBISHI CHEMICAL INDUSTRIES Co., Ltd. Trade name: MA-100) | |
| iron complex salt dye | 2 parts |
| (marketed by HODOGAYA CHEMICAL INDUSTRIES Co., Ltd. Trade name: T-77) | |

EXAMPLE 4

| | |
|---|---|
| resin D | 100 parts |
| carbon black | 6.5 parts |
| (marketed by MITSUBISHI CHEMICAL INDUSTRIES Co., Ltd. Trade name: MA-600) | |
| chromium complex salt dye | 2 parts |
| (marketed by ORIENT CHEMICAL INDUSTRIES Co., Ltd. Trade name: BONTRON S-34) | |

EXAMPLE 5

| | |
|---|---|
| resin E | 100 parts |
| carbon black | 6.5 parts |
| (marketed by MITSUBISHI CHEMICAL INDUSTRIES Co., Ltd. Trade name: MA-100) | |
| chromium complex salt dye | 2 parts |
| (marketed by HODOGAYA CHEMICAL INDUSTRIES Co., Ltd. Trade name: TRH) | |

EXAMPLE 6

| | |
|---|---|
| resin F | 100 parts |
| carbon black | 6.5 parts |
| (marketed by MITSUBISHI CHEMICAL INDUSTRIES Co., Ltd. Trade name: MA-100 | |
| chromium complex salt dye | 2 parts |
| (marketed by ORIENT CHEMICAL INDUSTRIES Co., Ltd. Trade name: BONTRON S-34) | |

EXAMPLE 7

| | |
|---|---|
| resin G | 100 parts |
| carbon black | 6.5 parts |
| (marketed by MITSUBISHI CHEMICAL INDUSTRIES Co., Ltd. Trade name: MA-600) | |
| chromium complex salt dye | 2 parts |
| (marketed by HODOGAYA CHEMICAL INDUSTRIES Co., Ltd. Trade name: TRH) | |

EXAMPLE 8

| | |
|---|---|
| resin H | 100 parts |
| carbon black | 6.5 parts |
| (marketed by MITSUBISHI CHEMICAL INDUSTRIES Co., Ltd. Trade name: MA-100) | |
| chromium complex salt dye | 2 parts |
| (marketed by HODOGAYA CHEMICAL INDUSTRIES Co., Ltd. Trade name: TRH) | |

EXAMPLE 9

| | |
|---|---|
| resin I | 100 parts |
| carbon black | 6.5 parts |
| (marketed by MITSUBISHI CHEMICAL INDUSTRIES Co., Ltd. Trade name: MA-600) | |

-continued

| | |
|---|---|
| chromium complex salt dye (marketed by ORIENT CHEMICAL INDUSTRIES Co., Ltd. Trade name: BONTRON S-34) | 2 parts |

EXAMPLE 10

| | |
|---|---|
| resin J | 100 parts |
| carbon black (marketed by MITSUBISHI CHEMICAL INDUSTRIES Co., Ltd. Trade name: MA-100) | 6.5 parts |
| iron complex salt dye (marketed by HODOGAYA CHEMICAL INDUSTRIES Co., Ltd. Trade name: T-77) | 2 parts |

EXAMPLE 11

| | |
|---|---|
| resin K | 100 parts |
| carbon black (marketed by MITSUBISHI CHEMICAL INDUSTRIES Co., Ltd. Trade name: MA-600) | 6.5 parts |
| chromium complex salt dye (marketed by ORIENT CHEMICAL INDUSTRIES Co., Ltd. Trade name: BONTRON S-34) | 2 parts |

EXAMPLE 12

| | |
|---|---|
| resin L | 100 parts |
| carbon black (marketed by MITSUBISHI CHEMICAL INDUSTRIES Co., Ltd. Trade name: MA-100) | 6.5 parts |
| chromium complex salt dye (marketed by HODOGAYA CHEMICAL INDUSTRIES Co., Ltd. Trade name: TRH) | 2 parts |

EXAMPLE 13

| | |
|---|---|
| resin M | 100 parts |
| carbon black (marketed by MITSUBISHI CHEMICAL INDUSTRIES Co., Ltd. Trade name: MA-100) | 6.5 parts |
| chromium complex salt dye (marketed by ORIENT CHEMICAL INDUSTRIES Co., Ltd. Trade name: BONTRON S-34) | 2 parts |

EXAMPLE 14

| | |
|---|---|
| resin N | 100 parts |
| carbon black (marketed by MITSUBISHI CHEMICAL INDUSTRIES Co., Ltd. Trade name: MA-600) | 6.5 parts |
| chromium complex salt dye (marketed by HODOGAYA CHEMICAL INDUSTRIES Co., Ltd. Trade name: TRH) | 2 parts |

EXAMPLE 15

| | |
|---|---|
| resin O | 100 parts |
| carbon black (marketed by MITSUBISHI CHEMICAL INDUSTRIES Co., Ltd. Trade name: MA-100) | 6.5 parts |
| chromium complex salt dye (marketed by HODOGAYA CHEMICAL INDUSTRIES Co., Ltd. Trade name: TRH) | 2 parts |

EXAMPLE 16

| | |
|---|---|
| resin P | 100 parts |
| carbon black (marketed by MITSUBISHI CHEMICAL INDUSTRIES Co., Ltd. Trade name: MA-600) | 6.5 parts |
| chromium complex salt dye (marketed by ORIENT CHEMICAL INDUSTRIES Co., Ltd. Trade name: BONTRON S-34) | 2 parts |

EXAMPLE 17

| | |
|---|---|
| resin Q | 100 parts |
| carbon black (marketed by MITSUBISHI CHEMICAL INDUSTRIES Co., Ltd. Trade name: MA-100) | 6.5 parts |
| iron complex salt dye (marketed by HODOGAYA CHEMICAL INDUSTRIES Co., Ltd. Trade name: T-77) | 2 parts |

EXAMPLE 18

| | |
|---|---|
| resin R | 100 parts |
| carbon black (marketed by MITSUBISHI CHEMICAL INDUSTRIES Co., Ltd. Trade name: MA-600) | 6.5 parts |
| chromium complex salt dye (marketed by ORIENT CHEMICAL INDUSTRIES Co., Ltd. Trade name: BONTRON S-34) | 2 parts |

EXAMPLE 19

| | |
|---|---|
| resin S | 100 parts |
| carbon black (marketed by MITSUBISHI CHEMICAL INDUSTRIES Co., Ltd. Trade name: MA-100) | 6.5 parts |
| chromium complex salt dye (marketed by HODOGAYA CHEMICAL INDUSTRIES Co., Ltd. Trade name: TRH) | 2 parts |

EXAMPLE 20

| | |
|---|---|
| resin T | 100 parts |
| carbon black | 6.5 parts |
| (marketed by MITSUBISHI CHEMICAL INDUSTRIES Co., Ltd. Trade name: MA-100) | |
| chromium complex salt dye | 2 parts |
| (marketed by HODOGAYA CHEMICAL INDUSTRIES Co., Ltd. Trade name: TRH) | |

Comparative Example 1

| | |
|---|---|
| resin a | 100 parts |
| carbon black | 6.5 parts |
| (marketed by MITSUBISHI CHEMICAL INDUSTRIES Co., Ltd. Trade name: MA-100) | |
| chromium complex salt dye | 2 parts |
| (marketed by ORIENT CHEMICAL INDUSTRIES Co., Ltd. Trade name: BONTRON S-34) | |

Comparative Example 2

| | |
|---|---|
| resin b | 100 parts |
| carbon black | 6.5 parts |
| (marketed by MITSUBISHI CHEMICAL INDUSTRIES Co., Ltd. Trade name: MA-600) | |
| iron complex salt dye | 2 parts |
| (marketed by HODOGAYA CHEMICAL INDUSTRIES Co., Ltd. Trade name: T-77) | |

Comparative Example 3

| | |
|---|---|
| resin c | 100 parts |
| carbon black | 6.5 parts |
| (marketed by MITSUBISHI CHEMICAL INDUSTRIES Co., Ltd. Trade name: MA-100) | |
| chromium complex salt dye | 2 parts |
| (marketed by HODOGAYA CHEMICAL INDUSTRIES Co., Ltd. Trade name: TRH) | |

Comparative Example 4

| | |
|---|---|
| copolymer comprising 1-dodecene and maleic anhydride used in Synthesis Example 1 | 100 parts |
| carbon black | 6.5 parts |
| (marketed by MITSUBISHI CHEMICAL INDUSTRIES Co., Ltd. Trade name: MA-100) | |
| chromium complex salt dye | 2 parts |
| (marketed by ORIENT CHEMICAL INDUSTRIES Co., Ltd. Trade name: BONTRON S-34) | |

Comparative Example 5

| | |
|---|---|
| polyester resin | 100 parts |
| (marketed by NIPPON CARBIDE; trade name: D-001) | |
| carbon black | 6.5 parts |
| (marketed by MITSUBISHI CHEMICAL INDUSTRIES Co., Ltd. Trade name: MA-600) | |
| chromium complex salt dye | 2 parts |
| (marketed by ORIENT CHEMICAL INDUSTRIES Co., Ltd. Trade name: BONTRON S-34) | |

Comparative Example 6

| | |
|---|---|
| resin d | 100 parts |
| carbon black | 6.5 parts |
| (marketed by MITSUBISHI CHEMICAL INDUSTRIES Co, Ltd. Trade name: MA-100) | |
| chromium complex salt dye | 2 parts |
| (marketed by ORIENT CHEMICAL INDUSTRIES Co., Ltd. Trade name: BONTRON S-34) | |

Comparative Example 7

| | |
|---|---|
| resin e | 100 parts |
| carbon black | 6.5 parts |
| (marketed by MITSUBISHI CHEMICAL INDUSTRIES Co., Ltd. Trade name: MA-600) | |
| iron complex salt dye | 2 parts |
| (marketed by HODOGAYA CHEMICAL INDUSTRIES Co., Ltd. Trade name: T-77) | |

Comparative Example 8

| | |
|---|---|
| resin f | 100 parts |
| carbon black | 6.5 parts |
| (marketed by MITSUBISHI CHEMICAL INDUSTRIES Co., Ltd. Trade name: MA-100) | |
| chromium complex salt dye | 2 parts |
| (marketed by HODOGAYA CHEMICAL INDUSTRIES Co., Ltd. Trade name: TRH) | |

Comparative Example 9

| | |
|---|---|
| resin g | 100 parts |
| carbon black | 6.5 parts |
| (marketed by MITSUBISHI CHEMICAL INDUSTRIES Co., Ltd. Trade name: MA-100) | |
| chromium complex salt dye | 2 parts |
| (marketed by ORIENT CHEMICAL INDUSTRIES Co., Ltd. Trade name: BONTRON S-34) | |

Comparative Example 10

| | |
|---|---|
| resin h | 100 parts |
| carbon black | 6.5 parts |
| (marketed by MITSUBISHI CHEMICAL INDUSTRIES Co., Ltd. Trade name: MA-600) | |
| iron complex salt dye | 2 parts |
| (marketed by HODOGAYA CHEMICAL INDUSTRIES Co., Ltd. Trade name: T-77) | |

The following evaluation tests were performed on the obtained toners.

(1) Fixing Temperature Range

Two component developers were obtained, which is comprised of 4 parts of the obtained toners in the Examples and Comparative Examples and 96 parts of non-coated Ferrite carrier (trade name: FL-1020, marketed by POWDER TECK Co.). The obtained developers were used to produce stripe test patterns of 2 cm×5 cm size on A4 size printing paper using a copying machine (trade name:Z-133, marketed by SANYO ELECTRIC Co.). Next, a fixing device having a thermal fixing roll whose surface is covered with fluorine-contained resin, and a press fixing roll whose surface is covered with silicone were used to fix the above unfixed test patterns. The fixing conditions were: pressure of the press fixing roll at 1 kg/cm², roll speed at 200 mm/sec. The unfixed test patterns were fixed by gradually rising the temperature of the surface of the thermal fixing roll at 5° C. When the temperature of the surface of the thermal fixing roll was gradually increased, it is observed whether the unfixed test patterns were fixed, and whether toner smudging was observed in a white margin of the printing sheet. A difference of the temperature between the lowest temperature and highest temperature at which the unfixed test patterns were sufficiently fixed and no toner smudging was observed in a white margin was defined as an Fixing Temperature Range.

Moreover, the fixing device can resist heat at less than 230° C.; therefore, when the unfixed test pattern is fixed and the toners do not smudge in a white margin at 230° C., the highest temperature was defined as "230° C. or greater".

(2) Fixing Strength

The unfixed test patterns were fixed by using the thermal fixing roll whose temperature of surface being 130° C. The image densities of the fixed test patterns were measured by an illuminameter (trade name: RD-914, marketed by MACBETH). After rubbing them (load: 300 g/cm², back and forth 5 times) with cotton pads under a constant rubbing pressure, the image densities were measured again. The fixing strength, in %, was determined according to the following mathematical expression, (After-rubbing strength/as-fixed strength)×100

The results of evaluation testing are summarized in Tables 1 to 3.

Moreover, in order to easily compare the evaluation testing results of the Examples with the Comparative Examples, the results of evaluation testing are arranged in Tables 1 to 3

TABLE 1

The toners comprising the first olefin resin

| | Used resin | Melt Starting Temperature (° C.) | Fixing Temperature Range (° C.) | Fixing Strength (%) |
|---|---|---|---|---|
| Example 1 | Resin A | 75 | 100~220 | 88 |
| Example 2 | Resin B | 80 | 110~230 or greater | 81 |
| Example 3 | Resin C | 73 | 110~230 or greater | 90 |
| Example 4 | Resin D | 74 | 110~230 or greater | 88 |
| Example 5 | Resin E | 83 | 120~215 | 80 |
| Example 6 | Resin F | 76 | 105~230 or greater | 83 |
| Example 7 | Resin G | 78 | 100~230 or greater | 82 |
| Comparative Example 1 | Resin a | 135 | 175~230 or greater | — |
| Comparative Example 2 | Resin b | 79 | Offset happens at any temperature | — |
| Comparative Example 3 | Resin c | 70 | Offset happens at any temperature | — |
| Comparative Example 4 | Copolymer comprising 1-dodecene and maleic anhydride | 73 | Offset happens at any temperature | — |
| Comparative Example 5 | Polyester resin | 93 | Offset happens at any temperature | — |

TABLE 2

The toners comprising the second olefin resin

| | Used resin | Melt Starting Temperature (° C.) | Fixing Temperature Range (° C.) | Fixing Strength (%) |
|---|---|---|---|---|
| Example 8 | Resin H | 74 | 100~230 or greater | 90 |
| Example 9 | Resin I | 78 | 110~230 or greater | 88 |
| Example 10 | Resin J | 73 | 100~230 or greater | 92 |
| Example 11 | Resin K | 71 | 100~230 or greater | 95 |
| Example 12 | Resin L | 80 | 120~230 or greater | 82 |
| Example 13 | Resin M | 72 | 105~230 or greater | 81 |
| Example 14 | Resin N | 73 | 100~200 | 96 |
| Comparative Example 6 | Resin d | 125 | 170~230 or greater | — |
| Comparative Example 7 | Resin e | 74 | Offset happens at any temperature | — |
| Comparative Example 8 | Resin f | 70 | Offset happens at any temperature | — |
| Comparative Example 4 | Copolymer comprising 1-dodecene and maleic anhydride | 73 | Offset happens at any temperature | — |
| Comparative Example 5 | Polyester resin | 93 | Offset happens at any temperature | — |

TABLE 3

The toners comprising the third olefin resin

| | Used resin | Melt Starting Temperature (° C.) | Fixing Temperature Range (° C.) | Fixing Strength (%) |
|---|---|---|---|---|
| Example 15 | Resin O | 79 | 100~220 | 88 |
| Example 16 | Resin P | 80 | 110~230 or greater | 81 |
| Example 17 | Resin Q | 73 | 110~230 or greater | 90 |
| Example 18 | Resin R | 74 | 110~230 or greater | 88 |
| Example 19 | Resin S | 83 | 110~215 | 80 |
| Example 20 | Resin T | 70 | 90~175 | 95 |
| Comparative Example 9 | Resin g | 135 | Offset happens at any temperature | — |
| Comparative Example 10 | Resin h | 79 | Offset happens at any temperature | — |
| Comparative Example 4 | Copolymer comprising 1-dodecene and maleic anhydride | 73 | Offset happens at any temperature | — |
| Comparative Example 5 | Polyester resin | 93 | Offset happens at any temperature | — |

It is clear from Tables 1 to 3 that the toners of the Examples have fixing temperature ranges of 100° C. or greater, and can be fixed at low temperatures such as 100 to 120° C. In addition, offset phenomena were not generated at high temperature in the toners of the Examples; therefore, it is confirmed that the toners of the examples have excellent anti-offset property. Moreover, the toners of the examples have fixing property of 80% or greater at 130° C., this value is satisfactory for practical use. It is also confirmed that the toners of the examples have excellent low temperature fixing property. In addition, the image densities of the developed images comprising the toners of the examples are satisfactory for practical use, and the toner smudging in a white margin of the printing sheet was not observed. Therefore, it is confirmed that the toners of the examples are suitable for practical use.

In contrast, the toners of the Comparative Examples have inferior anti-offset property; therefore, they do not have a fixing temperature range. Even when the toners of the Comparative Examples have the fixing temperature range; the toners have inferior low temperature fixing property; therefore, the offset phenomena occurred at 130° C. When the offset phenomena cause, or when the toners cannot be fixed, the fixing strength thereof cannot be evaluated.

In addition, 10,000 printings test were produced with the copying machine in which the two component developers comprising the obtained toners in the above item (1) were supplied.

The amounts of frictional electrification in the toners of the Examples were in a range of −25 μc/g to −29 μc/g, which were evaluated by Brow-off measurement equipment (marketed by TOSHIBA CHEMICAL Co., Ltd.). The image densities in the toners of the Examples were more than 1.4 after 10,000 printings; the densities were evaluated by an illuminameter (trade name: Z-1001DP, marketed by NIPPON DENNSYOKU INDUSTRIAL Co., Ltd.). The smudges thereof were less than 0.6 after 10,000 printings. The amounts of frictional electrification and the densities of smudges are suitable for practical use.

In addition, when the toners of the Examples were left alone at 50° C. for 2 days, blocking and caking cannot be observed; therefore, it is confirmed that the toners of the Examples have a good shelf life.

What is claimed is:

1. An electrophotographic toner comprising:
an olefin resin obtained by copolymerizing an α—olefin monomer with at least one monomer selected from the group consisting of maleic anhydride and a maleate ester, said copolymer being cross-linked by a diol, trivalent or greater valent polyol at the sites of the maleic anhydride or maleate ester units in the copolymer, wherein said at least one compound selected from the group consisting of a diol and a trivalent or greater valent polyol is an aliphatic diol having a long chain comprising 12 to 50 carbon atoms, polyoxyalkylene glycol or polyoxyalkylene bisphenol A.

2. An electrophotographic toner, comprising:
an olefin resin component which is a copolymer obtained by copolymerizing an α—olefin monomer with at least one monomer selected from the group consisting of maleic anhydride and a maleate ester, said copolymer being crosslinked at the sites of the maleic anhydride or maleate ester units in the copolymer, wherein said copolymer is comprised of a structural unit A represented by the formula (1)

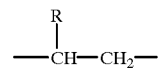

(1)

wherein, R represents a hydrogen atom or an alkyl group having 1 to 20 carbon atoms, and a structural unit B represented by formula (2)

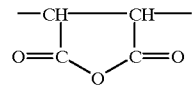

(2)

and/or the formula (3)

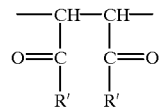

(3)

wherein, R' represents an alkoxyl group having 1 to 20 carbon atoms, and wherein the molar ratio of said structural units A and B is in a range of 20:80 and 80:20.

3. The electrophotographic toner as claimed in claim 2, wherein 5 to 100 mol % of said at least one monomer unit in the polymer selected from the group consisting of maleic anhydride and maleate ester is crosslinked.

4. An electrophotographic toner as claimed in claim 2, said copolymer being crosslinked by a diol or a trivalent or greater valent polyol at the sites of the maleic anhydride or maleate ester units in the copolymer.

5. An electrophotographic toner as claimed in claim 2, said copolymer being crosslinked by a bivalent or greater valent epoxy compound at the sites of the maleic anhydride or maleate ester units in the copolymer.

6. The electrophotographic toner as claimed in claim 5, wherein said bivalent or greater valent epoxy compound is an aliphatic polyglycol glycidyl ether, an epoxy resin synthesized from bisphenol A, an epoxy resin synthesized from hydrogenated bisphenol A, an epoxy resin synthesized from a phenol novolak, or an epoxy resin synthesized from a cresol novolak.

7. An electrophotographic toner comprising:
an olefin resin component which is a copolymer obtained by copolymerizing an α—olefin monomer with at least one monomer selected from the group consisting of maleic anhydride and a maleate ester, said copolymer being crosslinked by or having added thereto an aliphatic amino compound or an aliphatic polyamide resin at the sites of the maleic anhydride or maleate ester units in the copolymer, wherein the amine value of said aliphatic polyamide resin is in the range of 20 to 500 mg KOH/g.

8. An electrophotographic toner, comprising an olefin resin component which is a copolymer obtained by copolymerizing an α—olefin monomer with at least one monomer selected from the group consisting of maleic anhydride and a maleate ester, said copolymer being crosslinked at the sites of the maleic anhydride or maleate ester units in the copolymer, wherein said copolymer is comprised of a structural unit A represented by the formula (1)

(1)

wherein, R represents a hydrogen atom or an alkyl group having 1 to 20 carbon atoms, and a structural unit B represented by formula (2)

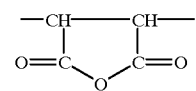

(2)

and/or the formula (3)

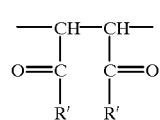

(3)

wherein, R' represents an alkoxyl group having 1 to 20 carbon atoms, and wherein a heat absorbing peak temperature measured by a Differential Scanning Calorimeter of said uncrosslinked copolymer is in a range of 60 to 120° C.

* * * * *